United States Patent Office 3,270,059
Patented August 30, 1966

3,270,059
PRODUCTION OF DIAMINOALKANES
Siegfried Winderl, Erich Haarer, Hubert Corr, and Paul Hornberger, Ludwigshafen (Rhine), Germany, assignors to Badische Anilin- & Soda-Fabrik Aktiengesellschaft, Ludwigshafen (Rhine) Germany
No Drawing. Filed Feb. 15, 1963, Ser. No. 258,905
Claims priority, application Germany, Feb. 21, 1962, B 66,040
3 Claims. (Cl. 260—583)

This invention relates to a process for the production of diamines from alkanediols, alkylene oxides, alkylenimines or alkanolamines and ammonia or primary or secondary amines. More specifically, the invention relates to the use of certain catalysts for this reaction.

It is known to prepare diamines from dihydric alcohols and ammonia in the presence of hydrogen at elevated temperature under the influence of catalysts having hydrogenating action. Alkanolamines, alkylene oxides or alkylenimines have also already been used as initial materials instead of dihydric alcohols. Primary and secondary amines have been used instead of ammonia, the corresponding secondary and tertiary diamines being obtained. The catalysts used in the known methods have been especially nickel, cobalt, copper, platinum or ruthenium, with or without aluminum or silicon, and with or without a carrier.

When the prior art catalysts are used, either small conversions or low yields are obtained, or the catalysts have only a relatively short life so that they must be regenerated relatively often when carrying out the process continuously.

It is an object of the present invention to provide a process for the production of diaminoalkanes from alkanediols, alkanolamines, alkylene oxides or alkylenimines in the presence of catalysts, which process can be carried out continuously without regenerating the catalyst after short periods. It is another object of the invention to provide a catalyst for a process for the production of diamines from the said initial materials which catalyst gives high conversion rates and high yields and has a long life.

These and other objects are achieved by passing a mixture of alkanediols, alkenediols, alkynediols, alkanolamines, alkylene oxides or alkylenimines with ammonia in the presence of hydrogen and, if desired, in the presence of water at a temperature of 150° to 300° C. at a pressure of at least 10 atmospheres over a catalyst which contains at least one metal sensitive to sulfur or sulfur compounds and which has been prepared by sintering.

When carrying out this process continuously, a considerably longer period of operation without regeneration and a longer life of the catalyst are achieved than when using conventional catalysts. The high yields obtained in continuous operation are also advantageous.

Examples of suitable initial materials are dihydric saturated alcohols whose hydroxy groups are attached to adjacent carbon atoms or to carbon atoms separated by one or more carbon atoms, alkylene oxides that contain one epoxy group or are derived from a cyclic ether, alkanolamines whose functional groups are attached to adjacent carbon atoms or to carbon atoms separated by one or more carbon atoms, and alkylenimines.

These initial materials contain at least two carbon atoms. Generally speaking, initial materials having chain lengths of more than eighteen carbon atoms are not used; usually the compounds used have two to twelve carbon atoms.

Examples of suitable initial materials are:

in the case of alcohols: alkanediols, such as ethylene glycol, 1,2-propanediol, 1,3-propanediol, 2,4-pentanediol, 1,5-pentanediol, 1,6-hexanediol, 2,5-hexanediol, 1,8-octanediol, 1,10-decanediol, and 1,12-dodecanediol;

in the case of alkanolamines: ethanolamine, diethanolamine, 1,4-butanolamine, 1,6-hexanolamine, and 1,8-octanolamine;

in the case of alkylenimines: ethylenimine, 1,2-propylenimine, 1,3-propylenimine, 1,4-butylenimine (pyrrolidine), 1,5-pentamethylenimine (piperidine), and 1,6-hexamethylenimine;

in the case of alkylene oxides: ethylene oxide, 1,3-propylene oxide, 1,3-trimethylene oxide, 1,4-tetramethylene oxide, and 1,5-pentamethylene oxide.

Of the preferred initial materials the alkanediols contain 2 to 12 carbon atoms, the alkanolamines 2 to 8 carbon atoms, the alkylene oxides 2 to 6 carbon atoms and the alkylenimines 2 to 6 carbon atoms.

The second reactant may be ammonia, in which case primary diamines are obtained. It is also possible to use low boiling primary amines, in which case secondary diamines are obtained. When secondary amines are used, tertiary diamines are obtained. Examples of suitable amines are methylamine, dimethylamine, ethylamine, diethylamine, propylamine, butylamine, amylamine, hexylamine, tridecylamine and stearylamine. The preferred amines contain 1 to 18 carbon atoms. The ammonia or amines are used in stoichiometric excess with reference to the alcohol, alkylene oxide, alkylenimine or alkanolamine. It is preferred to use 30 moles, advantageously 50 moles and particularly 60 to 150 moles of ammonia or amine per mole of amino groups to be introduced.

Hydrogen is used in an amount of 5 to 100 liters per mole of diol, alkylene oxide, alkylenimine or alkanolamine, and particularly 5 to 10 liters per mole of initial material. In some cases, 2 liters of hydrogen per mole of initial material is sufficient.

The process may also be carried out in the presence of water, for example, 1 to 50% by weight with reference to all the reactants. The coemployment of water is advantageous when one of the initial materials is in solid form, for example 1,6-hexanediol. The process may also be carried out in the presence of larger amounts of water if it is to be carried out in greater dilution.

The catalysts used according to this invention preferably contain a metal of groups I–B and VIII of the Periodic System (Handbook of Chemistry and Physics, 39th ed., Cleveland, Ohio, pp. 394–395) which is sensitive to sulfur. A catalyst is sensitive to sulfur if it becomes inactive upon contact with a sulfur-containing compound. Examples of suitable catalysts are copper, silver, iron, nickel but particularly cobalt. In some cases it is recommendable to use catalysts containing two or more of the said metals. The catalysts may be prepared for example by sintering powdered metals, if desired in admixture with carrier substances, such as pumice, alumina, corundum, diatomaceous earth, silica gel, silicon carbide, synthetic or natural silicates, porcelain or quartz, at temperatures which advantageously are only slightly lower than the melting point of the metal in question. The catalyst is then brought into a convenient form by one of the conventional methods. It is advantageous to exclude oxygen during the production of catalysts of this type, or the catalysts may be reduced again prior to use.

Particularly favorable results are obtained by starting from oxygen compounds of the said metals. Oxides of the said metals, or other oxygen compounds which are converted into the oxides at the latest at the sintering temperature, such as hydroxides, carbonates, nitrates and nitrites, are heated, advantageously in the presence of atmospheric oxygen, to temperatures above 700° C., advantageously above 1000° C., preferably 1050° C. to 1200° C. or more. Although the initial material may also be heated up to the melting point for the production of the catalysts, it is generally preferred to heat to a temperature which lies about 20° C., advantageously 30° to 60° C. lower than the melting point of the metal compound in question. The above-mentioned carrier substances may also be admixed in this method of preparation. In some cases it is also recommended to add promoters, such as alkali metal compounds, alkaline earth metal compounds, titanium dioxide, antimony, bismuth, or compounds of the metals of group V or VI of the Periodic System (ibid.).

The duration of the sintering depends on the temperature chosen and is in general at least half an hour and advantageously one to five hours. The sintered oxides are either first shaped and then heated with hydrogen at temperatures below 600° C., advantageously between about 300° and 400° C., until the oxide has been practically completely reduced to metal, or first reduced by treatment with hydrogen and then brought into a suitable shape. If the hydrogen treatment is carried out under pressure, lower temperatures, for example 250° to 370° C. are generally necessary. In some cases it is advantageous to carry out the reduction in the reactor in which the hydrogenation of the carbon compounds is to be carried out so that the catalyst does not have to come into contact wtih atmospheric oxygen again.

The process may be carried out for example by passing the reactants and hydrogen over the catalyst at the reaction temperature and under pressure. The residence period of the reactants in the reactor may vary within wide limits. In general residence periods of ten minutes to two hours have proved to be suitable.

Depending on the nature of the initial materials and the proportions used, an equilibrium is set up in which the diamine is present together with the imine, more highly condensed amines and possibly alkanolamine and alkanediols. It is advantageous to separate the diamine from this mixture, for example by distillation, and to return all the other products. By adding fresh initial material to these returned products and repeating the process, substantial conversion of the initial materials into the desired diamines can be achieved.

The reaction is carried out at 150° to 300° C., especially at 160° to 250° C., and advantageously at 170° to 230° C., and under a pressure of 10 to 500 atmospheres or more, especially at 25 to 500 atmospheres, for example at 50, 100, 200 or 300 atmospheres.

In this way diamines are obtained from the initial materials in yields of 70 to 90% in continuous operation and with a long life of the catalysts.

The following examples will further illustrate the invention.

*Example 1*

50 liters per hour of hydrogen is led at atmospheric pressure for twenty-four hours at 350° C. and then for twelve hours at 400° C. over 300 cc. (570 g.) of a shaped catalyst prepared from finely powdered cobalt oxide by sintering by heating to 1100° C. and shaping into rods about 4 mm. in diameter and 6 mm. in average length. 20 g. of ethylene glycol, 500 cc. of ammonia (measured as liquid) and 30 liters of hydrogen (measured at atmospheric pressure) are passed per hour at 180° C. under a pressure of 300 atmospheres over the reduced catalyst, thus prepared. By working up by distillation the reaction product obtained during twenty-four hours, 223 g. of water, 292 g. of ethylene diamine, 30 g. of piperazine, 64 g. of ethanolamine, 48 g. of ethylene glycol and 26.5 g. of diethanolamine are obtained. The conversion of ethylene glycol is 90%; 78% of the reacted ethylene glycol is obtained as ethylene diamine.

By adding 25 g. of 1,2-propanediol instead of 20 g. ethylene glycol and following otherwise the same procedure, 75% of the 1,2-propanediol reacted is obtained as 1,2-diaminopropane at a yield of about 80%.

*Example 2*

9.2 kg. of cobalt carbonate and 0.9 kg. of nickel formate are mixed, the mixture is calcined and the oxide mixture is moistened with water and shaped by means of an extruder. The moldings which are 4 mm. in diameter and 6 mm. in average length are then sintered at 1050° C. in the presence of air. 500 cc. of the catalyst thus prepared is converted into a reactive metallic catalyst by passing 30 liters per hour of hydrogen thereover at atmospheric pressure for twenty-four hours at 325° C. and then for twenty-four hours at 375° C. The reactor is pressured to 200 atmospheres of hydrogen and 50 liters of hydrogen (measured at standard pressure), 850 cc. of liquid ammonia, 31 g. of ethanolamine and 5 g. of diethanolamine are passed per hour over the catalyst. A reaction mixture of about 93 g. of water, 211 g. of cethylene diamine, 71 g. of piperazine, 22 g. of ethanolamine and 24 g. of diethanolamine is obtained within ten hours. This is an ethanolamine conversion of about 93% and an ethylene diamine yield of 74.5% with reference to reacted ethanolamine.

Substantially the same result is obtained by using 28 g. of ethylene oxide instead of 31 g. of ethanolamine and 5 g. of diethanolamine.

*Example 3*

25 g. of a mixture of 83.5% of 1,6-hexanediol and 16.5% of water, 500 cc. of ammonia (measured as a liquid) and 50 liters of hydrogen (measured at standard pressure) are passed per hour at 205° C. at a pressure of 280 atmospheres over 500 cc. (930 g.) of a sintered cobalt catalyst prepared as described in Example 1. The reaction product obtained during seventy-two hours is worked up by distillation; 375 g. of 1-,6-hexamethylenediamine is obtained. The following are also obtained: 422 g. of water, 598 g. of hexamethylenimine and 307 g. of residue (about 19% of unreacted hexanediol, i.e., 5% of the amount added, 27% of 1,6-hexanolamine, i.e., 7% of the 1,6-hexanediol added, and 46% of various condensed $C_{12}$-polyamines, i.e., 12% of the 1,6-hexanediol added).

If 25 g. per hour of a mixture of 27.8% of 1,6-hexanediol, 55.5% of a 60% aqueous solution of hexamethylenimine and 16.7% of the said distillation residue be passed over the catalyst under the said conditions, working up by distillation of the reaction product obtained in seventy-two hours yields 561 g. of water, 703 g. of hexamethylenimine, 359 g. of 1,6-hexamethylenediamine and 297 g. of 1,6-hexamethylenediamine (74% of the theory with reference to diol) are obtained from 510 g. of 1,6-hexanediol. No decline in the activity of the catalyst is observed after a reaction period of six months.

*Example 4*

50 g. of a solution of 50% of hexamethylenimine and 50% of water, 500 cc. of liquid ammonia and 50 liters of hydrogen (measured at standard pressure) are passed per hour at 180° C. under a pressure of 280 atmospheres over 500 cc. of the cobalt catalyst described in Example 1. Working up of the reaction product obtained in twenty-four hours yields 587 g. of water, 372 g. of hexamethylenimine, 154 g. of 1,6-hexamethylenediamine and 18 g. of residue. The conversion is therefore 38%; of the imine reacted, 57.6% is obtained as diamine. The unreacted imine and the residue are reemployed.

*Example 5*

A catalyst is prepared by heating and sintering 950 g. of cobalt oxide and 50 g. of cupric oxide at 1100° C. It is shaped into rods 4 mm. in diameter and 6 mm. in average length. 50 liters per hour of hydrogen is passed over 300 cc. of this catalyst for twenty-four hours under standard pressure at 350° C. and then for twelve hours at 400° C. 25 g. per hour of a mixture of 1,6-hexanediol and water (containing 83.5% of 1,6-hexanediol and 16.5% of water), 500 cc. of ammonia (measured as liquid) and 50 liters of hydrogen (measured at standard pressure) are passed at 205° C. at a pressure of 280 atmospheres over the reduced catalyst thus obtained. The following are obtained by working up by distillation the reaction product obtained during 168 hours:

884 g. of 1,6-hexamethylenediamine
1081 g. of hexamethylenimine and
652 g. of residue (about 21% of unreacted 1,6-hexanediol, i.e., 5% of the hexanediol added, 29% of 1,6-hexanolamine, i.e., 7% of the hexanediol added, and 50% of condensed $C_{12}$-amines, i.e., 12% of the hexanediol added).

Therefore of a total of 3507 g. of hexanediol supplied, 24.8% is obtained in the form of hexamethylenediamine and 36.8% in the form of hexamethylenimine, and the hexamethylenimine may be reused as in Example 3

A sintered nickel catalyst may be used instead of the cobalt-copper catalyst. The conversion is the same reaction period is then less, while the ratio of 1,6-hexamethylenediamine to hexamethylenimine remains the same.

*Example 6*

By using the same catalyst and the same conditions as described in Example 1 and employing 20 g. of ethylene glycol, 500 cc. of liquid diethylamine and 30 liters (measured at standard pressure) of hydrogen, N,N,N',N'-tetraethylethylenediamine is obtained, besides unreacted ethylene glycol and water, in a yield of 60% of the theory. The conversion of ethylene glycol is about 85%. Furthermore, approximately 23% of the theory of N,N-diethylethanolamine and small amounts of higher amines are obtained.

*Example 7*

By following the procedure described in Example 2 but using 1,3-propanolamine instead of ethanolamine and diethanolamine, and isopropylamine instead of ammonia, N-isopropyl-1,3-diaminopropane is obtained in a yield of approximately 90% of the 1,3-propanolamine reacted. The conversion is approximately 87%.

We claim:

1. A process for the production of diaminoalkanes which comprises passing at least one compound selected from the group consisting of alkanediols of 2 to 12 carbon atoms, alkanolamines of 2 to 8 carbon atoms, alkylene oxides of 2 to 6 carbon atoms and alkylenimines of 2 to 6 carbon atoms, and a member selected from the group consisting of ammonia and an alkylamine of 1 to 8 carbon atoms, in the presence of hydrogen at a temperature of from 150° to 300° C. and at a pressure of at least 10 atmospheres over a catalyst which contains at least one metal selected from the group consisting of cobalt and nickel, which catalyst is obtained from the oxygen compounds of the said metals by sintering at a temperature of from 700° C. up to a temperature 20° C. below the melting point of the metal compounds and then reducing the sintered metal compound by treatment with hydrogen.

2. A process for the production of diaminoalkanes which comprises passing at least one compound selected from the group consisting of alkanediols of 2 to 12 carbon atoms, alkanolamines of 2 to 8 carbon atoms, alkylene oxides of 2 to 6 carbon atoms and alkylenimines of 2 to 6 carbon atoms, and a member selected from the group consisting of ammonia and an alkylamine of 1 to 18 carbon atoms, in the presence of hydrogen at a temperature of from 150° to 300° C. and at a pressure of at least 10 atmospheres over a catalyst which contains at least one metal selected from the group consisting of cobalt and nickel, which catalyst is obtained from the oxygen compounds of the said metals by sintering at a temperature of from 700° C. up to a temperature 20° C. below the melting point of the metal compounds and then reducing the sintered metal compound by treatment with hydrogen, separating the alkanediamine formed and recycling the other reaction products over the catalyst.

3. A process as claimed in claim 1 in which a catalyst is used which is supported on a carrier.

References Cited by the Examiner

UNITED STATES PATENTS

| | | | |
|---|---|---|---|
| 2,519,560 | 8/1950 | Fowler | 260—585 |
| 2,754,330 | 7/1956 | Schreger | 260—585 |
| 3,068,290 | 12/1962 | Lichtenberger et al. | 260—585 |

CHARLES B. PARKER, *Primary Examiner.*

ANTON H. SUTTO, *Assistant Examiner.*